United States Patent
Byun

(10) Patent No.: US 11,360,889 B2
(45) Date of Patent: Jun. 14, 2022

(54) MEMORY SYSTEM AND OPERATING METHOD THEREOF PERFORMING GARBAGE COLLECTION AND WRITE OPERATIONS IN PARALLEL ON DIFFERENT DIES

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 248 days.

(21) Appl. No.: 16/681,374

(22) Filed: Nov. 12, 2019

(65) Prior Publication Data

US 2020/0201755 A1    Jun. 25, 2020

(30) Foreign Application Priority Data

Dec. 21, 2018 (KR) ........................ 10-2018-0167584

(51) Int. Cl.
*G06F 3/06* (2006.01)
*G06F 12/122* (2016.01)
*G06F 12/02* (2006.01)

(52) U.S. Cl.
CPC ........ *G06F 12/0253* (2013.01); *G06F 3/0604* (2013.01); *G06F 3/0631* (2013.01); *G06F 3/0652* (2013.01); *G06F 3/0659* (2013.01); *G06F 12/122* (2013.01); *G06F 2212/1044* (2013.01)

(58) Field of Classification Search
CPC .. G06F 12/0253; G06F 12/122; G06F 3/0631; G06F 3/0659; G06F 3/0604; G06F 3/0652; G06F 2212/1044; G06F 12/0246; G06F 2212/7205; G06F 3/0679; G06F 3/0608
See application file for complete search history.

(56) References Cited

U.S. PATENT DOCUMENTS

| | | | | |
|---|---|---|---|---|
| 9,996,268 | B2* | 6/2018 | Nishikubo | G06F 3/0611 |
| 10,007,451 | B2* | 6/2018 | Zhang | G06F 3/0616 |
| 10,102,146 | B2* | 10/2018 | Virajamangala | G06F 12/123 |
| 10,114,576 | B2* | 10/2018 | Peterson | G06F 12/0253 |
| 2016/0026408 | A1* | 1/2016 | Peterson | G06F 12/0238 711/103 |
| 2017/0177235 | A1* | 6/2017 | Nishikubo | G06F 3/0656 |
| 2018/0088805 | A1* | 3/2018 | Kanno | G06F 12/10 |
| 2018/0253376 | A1* | 9/2018 | Nishikubo | G06F 3/0679 |
| 2018/0314434 | A1* | 11/2018 | Simonson | G06F 12/0875 |
| 2018/0314630 | A1* | 11/2018 | Camp | G06F 12/0246 |
| 2018/0336127 | A1* | 11/2018 | Hutchison | G06F 12/0246 |

(Continued)

FOREIGN PATENT DOCUMENTS

| KR | 10-2016-0044989 | 4/2016 |
|---|---|---|
| KR | 10-2016-0110596 | 9/2016 |

(Continued)

*Primary Examiner* — Christopher D Birkhimer
(74) *Attorney, Agent, or Firm* — IP & T Group LLP

(57) ABSTRACT

A memory system may include: a memory device including plural memory dies each having plural memory blocks; and a controller configured to control the memory device to independently perform an operation to each of the memory dies, wherein the controller controls the memory device to perform a foreground operation to a first one among the memory dies while performing a background operation to a second one among the memory dies.

21 Claims, 15 Drawing Sheets

(56) References Cited

U.S. PATENT DOCUMENTS

2018/0336129 A1* 11/2018 Hutchison ........... G06F 12/0246
2018/0341557 A1* 11/2018 Koo .................... G06F 12/0246
2019/0266082 A1* 8/2019 Na ....................... G06F 3/0679

FOREIGN PATENT DOCUMENTS

| KR | 10-2017-0035155 | 3/2017 |
| KR | 10-2017-0083963 | 7/2017 |

* cited by examiner

MEMORY SYSTEM AND OPERATING METHOD THEREOF PERFORMING GARBAGE COLLECTION AND WRITE OPERATIONS IN PARALLEL ON DIFFERENT DIES

CROSS-REFERENCE TO RELATED APPLICATION

This application claims priority under 35 U.S.C. § 119 to Korean Patent Application No. 10-2018-0167584 filed on Dec. 21, 2018, which is incorporated herein by reference in its entirety.

BACKGROUND

1. Field

Exemplary embodiments relate to a semiconductor device, and more particularly, to a memory system and an operating method thereof.

2. Discussion of the Related Art

Recently, the paradigm for the computer environment has shifted to ubiquitous computing, which allows computer systems to be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

SUMMARY

Various embodiments are directed to an operating method of a memory system for performing a garbage collection operation, and a memory system including a memory controller and a memory device to perform the operating method.

In an embodiment, a memory system may include: a memory device including a plurality of dies each having a plurality of memory blocks; and a controller including a processor and a memory, wherein the processor comprises a garbage collection manager suitable for: checking whether a plurality of closed blocks is present in other dies other than a write-target die including an open block among the plurality of dies, determining whether to perform a garbage collection operation to the other dies in parallel with a write operation to the write-target die based on a result of the checking of whether the plurality of closed blocks is present in the other dies, selecting one or more garbage-collection-target dies among the other dies and a victim block among the closed blocks within the garbage-collection-target dies when the plurality of closed blocks is present in the other dies, and performing the garbage collection operation to the garbage-collection-target dies in parallel with the write operation to the write-target die according to a result of the determining.

In an embodiment, there is provided an operating method of a memory system which includes: a memory device including a plurality of dies each having a plurality of memory blocks; and a controller including a processor and a memory, the operating method comprising: checking whether a plurality of dosed blocks is present in other dies other than a write-target die including an open block among the plurality of dies; determining whether to perform a garbage collection operation to the other dies in parallel with a write operation to the write-target die based on a result of the checking; selecting one or more garbage-collection-target dies among the other dies and a victim block among the closed blocks within the garbage-collection-target dies, when the plurality of closed blocks is present in the other dies; and performing the garbage collection operation to the garbage-collection-target dies in parallel with the write operation according to a result of the determining.

In an embodiment, a memory system may include: a memory device including plural memory dies each having plural memory blocks; and a controller configured to control the memory device to independently perform an operation to each of the memory dies, wherein the controller controls the memory device to perform a foreground operation to a first one among the memory dies while performing a background operation to a second one among the memory dies.

DETAILED DESCRIPTION

Various embodiments of the invention are described below in more detail with reference to the accompanying drawings. It is noted, however, that the invention may be embodied in different forms. Moreover, aspects and features of the present invention may be configured or arranged differently than shown in the illustrated embodiments. Thus, the present invention is not to be construed as being limited to the embodiments set forth herein. Rather, the described embodiments are provided so that this disclosure is thorough and complete, and fully conveys the present invention to those skilled in the art to which this invention pertains. Also, throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Various embodiments of the present invention are described in detail below with reference to the attached drawings.

Figure 1:
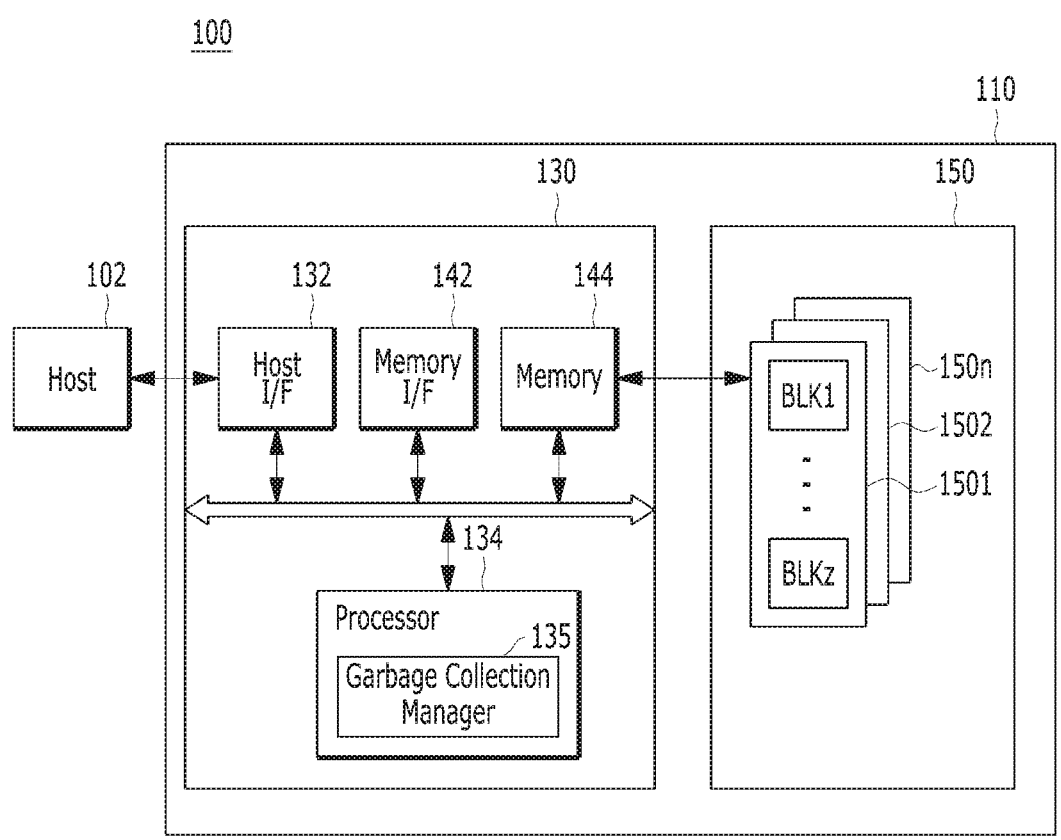
FIG. 1 is a block diagram illustrating a data processing system including a memory system in accordance with an embodiment of the present invention.

FIG. 1 is a block diagram illustrating a data processing system 100 including a memory system in accordance with an embodiment.

Referring to FIG. 1, the data processing system 100 may include a host 102 and a memory system 110.

The host 102 may be embodied by any of various electronic devices, for example, portable electronic devices such as a mobile phone, an MP3 player and a laptop computer or electronic devices such as a desktop computer, a game machine, a television (TV) and a projector, that is, wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 corresponding to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various types of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

Any of the storage devices which implement the memory system 110 may be a volatile memory device such as a dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory dies 1501 to 150n.

Each of the plurality of memory dies 1501 to 150n includes a plurality of memory blocks BLK0 to BLKz-1, each of which includes a plurality of pages. Each of the pages includes a plurality of memory cells to which a plurality of word lines (WL) are coupled. Also, the memory device 150 includes a plurality of planes, each of which includes a plurality of memory blocks, e.g., blocks BLK0 to BLKz-1. In particular, the memory device 150 may include a plurality of memory dies 1501 to 150*n*, each of which includes a plurality of planes. The memory device 150 may be a nonvolatile memory device, for example, a flash memory. The flash memory may have a three-dimensional (3D) stack structure.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program, and erase operations.

The controller 130 includes a host interface (I/F) 132, a processor 134, a memory interface (I/F) 142, a memory 144, and a cache controller 145.

The host interface unit 132 is for handling commands, data, and the like transmitted from the host 102. By way of example but not limitation, the host interface unit 132 can include a command queue 52. The command queue 52 can sequentially store at least some of the commands, data, or the like transmitted from the host 102 and output the commands and data to a cache controller 145 in their stored order.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 32 may be driven through firmware referred to as a host interface layer (HIL), which is a region which exchanges data with the host 102.

The memory interface 142 serves as a memory interface and/or storage interface which performs interfacing between the controller 130 and the memory device 150 to allow the controller 130 to control the memory device 150 in response to a request from the host 102. The memory interface 142 generates control signals for the memory device 150 and processes data according to the control of the processor 134, as a NAND flash controller (NFC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface, in particular, data input/output between the controller 130 and the memory device 150. The emory interface 142 may be driven through firmware, referred to as a flash interface layer (FIL), which is a region which exchanges data with the memory device 150.

The memory 144, as the working memory of the memory system 110 and the controller 130, stores data for driving the memory system 110 and the controller 130. For example, when the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program, and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM). Furthermore, the memory 144 may be disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data to perform data read and write operations between the host 102 and the memory device 150, and data when performing the data read and write operations. For such data storage, the memory 144 includes a program memory, a data memory, a write buffer/cache, a read buffer/cache, a data buffer/cache, a map buffer/cache, and the like.

The processor 134 controls all operations of the memory system 110. In particular, the processor 134 controls a program operation or a read operation for the memory device 150, in response to a write request or a read request from the host 102. The processor 134 drives firmware, referred to as a flash translation layer (FTL), to control the general operations of the memory system 110. The processor 134 may be more than one processor, each of which may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the foreground operation includes a program operation corresponding to a write command, a read operation corresponding to a read command, an erase operation corresponding to an erase command or a parameter set operation corresponding to a set parameter command or a set feature command as a set command.

The processor 134 may drive the garbage collection manager 135.

Before the garbage collection manager 135 is described, the following condition may be considered: the amount of invalid data stored in a nonvolatile memory region of a nonvolatile memory device is increased by repeated write commands. In order to reuse a memory block in which such invalid data are stored, the controller 130 may perform an internal operation (for example, garbage collection or wear leveling). For example, the controller 130 may perform garbage collection to change the memory block having the invalid data stored therein into a free block. During the garbage collection operation, the controller 130 selects a victim block including a smaller number of valid pages than an arbitrarily set threshold value among a plurality of closed blocks. The controller 130 may copy the valid pages included in the victim block into a target block which is a free block, and then erase the victim block to become a free block. The reason to select the victim block having a small number of valid pages is because, when the controller 130 copies the valid pages included in the victim block into the target block and then invalidates the data of the victim block, much time and cost may be required for performing garbage collection in the case that the victim block has a large number of valid pages.

In accordance with an embodiment of the present invention, the processor 134 may perform the garbage collection operation and a write operation in parallel with each other, in order to effectively reduce the time and cost required for performing garbage collection. That is, the processor 134 may check whether the write operation and the garbage collection operation can be performed in parallel with each other, through the garbage collection manager 135, and then perform the garbage collection operation based on the check result. This process will be described in detail with reference to FIGS. 6 to 8. At this time, a plurality of dies included in the memory device in accordance with the present embodiment may be independently managed by one or more channels CHANNEL. The present embodiment will be described under the supposition that a plurality of memory blocks included in the plurality of dies are not configured as super blocks.

In some embodiments, there is provided a memory system which includes one or more processors and one or more storage devices including a program command while interworking with a host. For example, the one or more processors and the one or more storage devices including the program command may be implemented as a memory 144 and a processor 134 which are included in the controller 130. This configuration will be described in detail with reference to FIGS. 6 to 8. A memory device in the memory system in accordance with embodiments of the present disclosure is described below in detail with reference to FIGS. 2 to 5.

Figure 2:
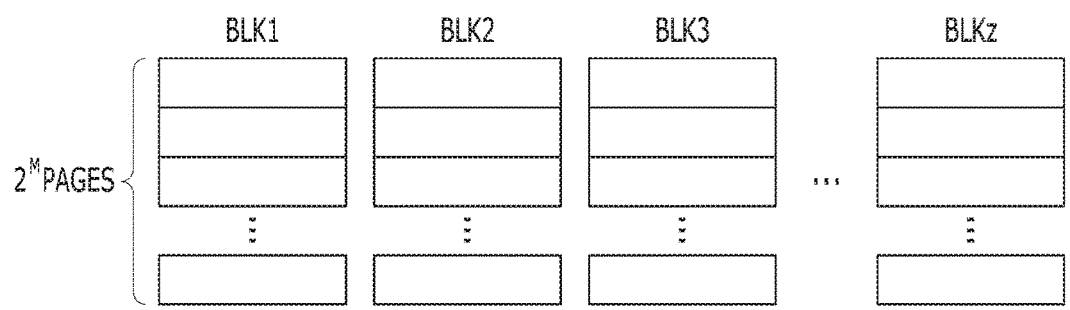
FIG. 2 is a diagram schematically illustrating a memory device in a memory system in accordance with an embodiment.
Figure 3:
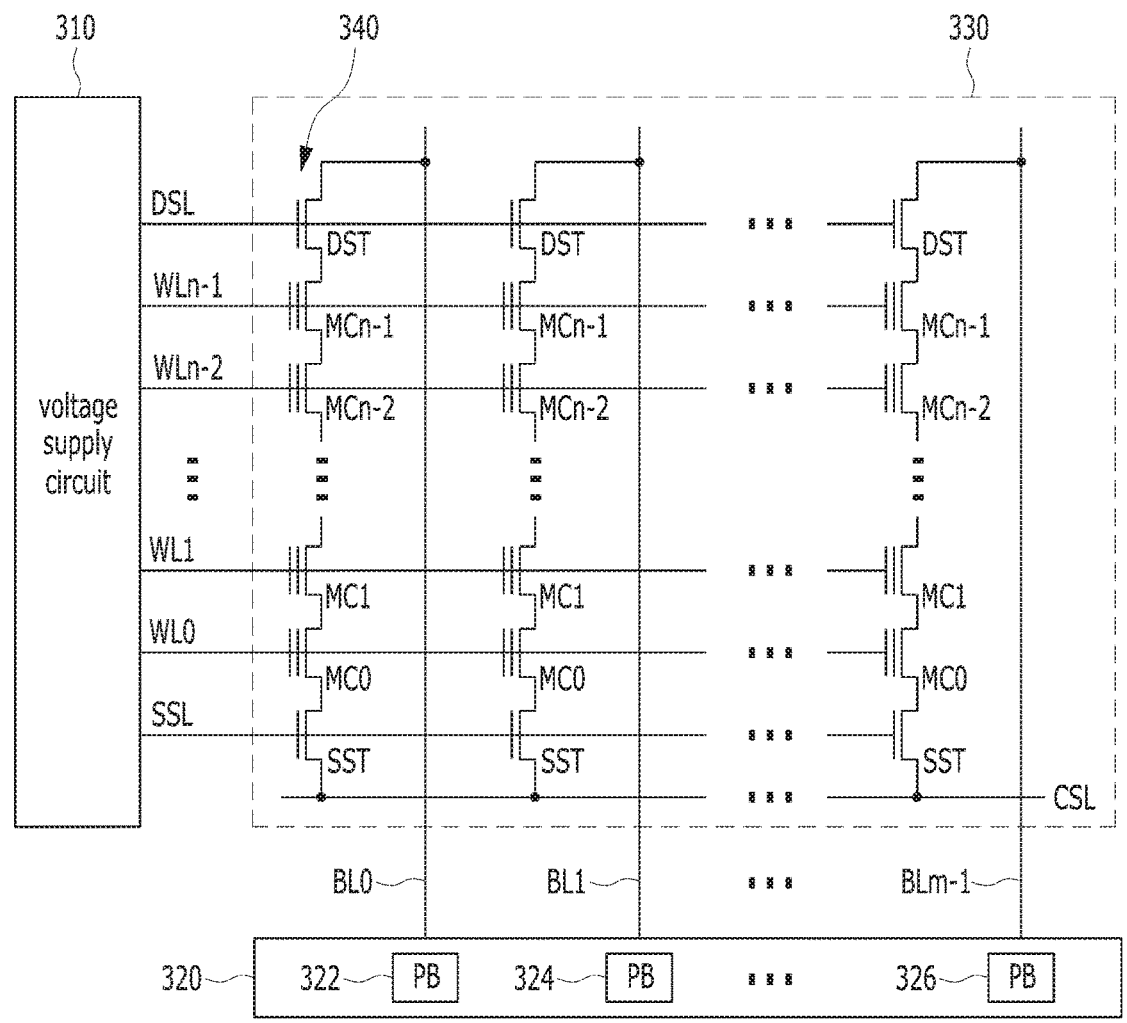
FIG. 3 is a diagram schematically illustrating a memory cell array circuit of a memory block in a memory device in accordance with an embodiment.
Figure 4:
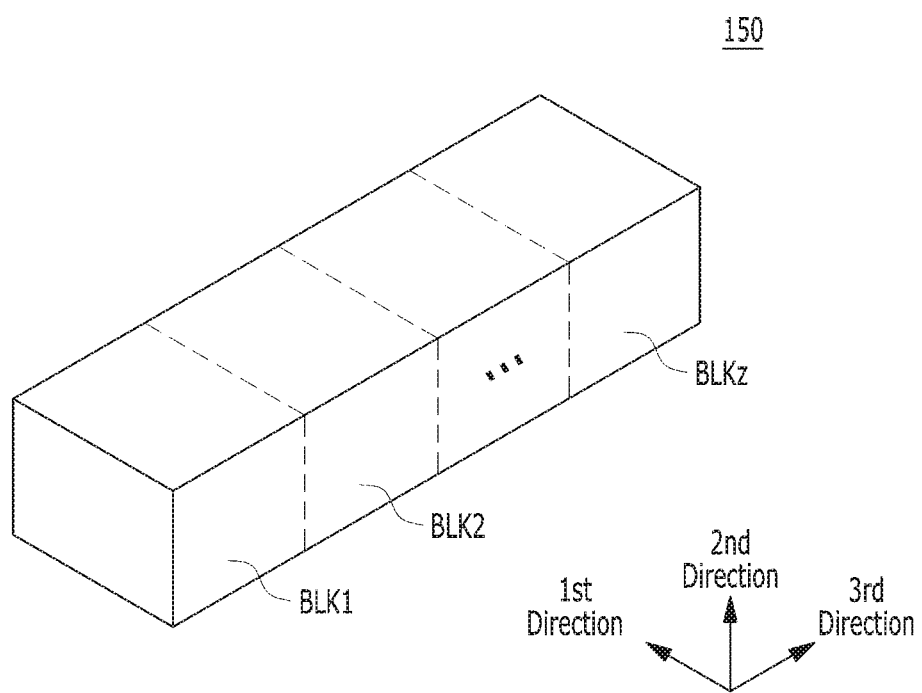
FIG. 4 is a diagram schematically illustrating a memory device in a memory system in accordance with an embodiment.

FIG. 2 is a diagram illustrating a memory device in a memory system, FIG. 3 is a diagram illustrating a memory cell array circuit of a memory block in a memory device, and FIG. 4 is a diagram illustrating a structure of a 3-dimensional nonvolatile memory device.

Referring to FIG. 2, the memory device 150 includes a plurality of memory blocks, for example, a zeroth block (BLOCK0) 210, a first block (BLOCK1) 220, a second block (BLOCK2) 230 and an (N-1)th block (BLOCKN-1) 240. Each of the blocks 210, 220, 230 and 240 includes a plurality of pages, for example, $2^M$ or M pages. Each of the pages includes a plurality of memory cells to which a plurality of word lines (WL) are coupled.

The memory device 150 may include single level cell (SLC) memory blocks and/or multi-level cell (MLC) memory blocks, depending on the number of bits to be stored in or expressed by one memory cell. An SLC memory block includes a plurality of pages which are realized by memory cells each storing 1 bit, and has high data calculation performance and high durability. An MLC memory block includes a plurality of pages which are realized by memory cells each storing multi-bit data (for example, 2 or more bits), and has a larger data storage space than the SLC memory block, that is, is capable of being highly integrated. In particular, the memory device 150 may include, as MLC memory blocks, an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data, or a multiple level cell memory block including pages which are realized by memory cells each capable of storing 5 or more-bit data.

While it is described as an example that the memory device 150 is realized by a nonvolatile memory such as a flash memory, for example, a NAND flash memory, it is noted that the memory device 150 may be implemented as any of multiple types of memories such as a phase change memory (i.e., phase change random access memory (PCRAM)), a resistive memory (i.e., resistive random access memory (RRAM or ReRAM)), a ferroelectric memory (i.e., ferroelectric random access memory (FRAM)) and a spin transfer torque magnetic memory (Le., spin transfer torque magnetic random access memory (STT-RAM or STT-MRAM)).

Each of the memory blocks 210, 220, 230 and 240 stores the data provided from the host 102 of FIG. 1, through a write operation, and provides stored data to the host 102, through a read operation.

Referring to FIG. 3, among the plurality of memory blocks 152, 154 and 156 in the memory device 150 of the memory system 110, each memory block 330 may include a plurality of cell strings 340 which are realized as a memory cell array and are coupled to bit lines BL0 to BLm-1, respectively. The cell string 340 of each column may include at least one drain select transistor DST and at least one source select transistor SST. A plurality of memory cells or memory cell transistors MC0 to MCn-1 may be coupled in series between the select transistors SST and DST. The respective memory cells MC0 to MCn-1 may be constructed by multi-level cells (MLC) each of which stores data or information of a plurality of bits. The cell strings 340 may be electrically coupled to corresponding bit lines BL0 to BLm-1, respectively.

While FIG. 3 shows, as an example, each memory block 330 constructed by NAND flash memory cells, it is noted that each of the plurality of memory blocks 152,154,156 is not limited to a NAND flash memory and may be realized by a NOR flash memory, a hybrid flash memory in which at least two types of memory cells are combined, or a one-NAND flash memory in which a controller is built in a memory chip. The memory device 150 may be realized as not only a flash memory device in which a charge storing layer is constructed by conductive floating gates but also a charge trap flash (CTF) memory device in which a charge storage layer is constructed by a dielectric layer.

A voltage supply circuit 310 of the memory device 150 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply circuit 310 may be performed by the control of a control circuit (not shown). The voltage supply circuit 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 150 is controlled by a control circuit (not shown), and may operate as a sense amplifier or a write driver according to an operation mode. In a verify/normal read operation, the read/write circuit 320 may operate as a sense amplifier for reading data from the memory cell array. In a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. In particular, as shown in FIG. 4, the memory device 150 may be realized as a nonvolatile memory device with a three-dimensional stack structure. In the case where the memory device 150 is realized as a three-dimensional structure, the memory device 150 may include a plurality of memory blocks BLK0 to BLKN-1. FIG. 4 illustrates the memory blocks 152, 154 and 156 of the memory device 150 shown in FIG. 1. Each of the memory blocks 152, 154 and 156 may be realized as a 3-dimensional structure (or a vertical structure). For example, the respective memory blocks 152, 154 and 156 may be realized as a 3-dimensional structure which extends in first to third directions, for example, the x-axis direction, the y-axis direction and the z-axis direction.

Each memory block 330 may include a plurality of NAND strings NS which extend in the second direction. The plurality of NAND strings NS may be provided in the first direction and the third direction. Each NAND string NS may be coupled to a bit line BL, at least one string select line SSL, at least one ground select line GSL, a plurality of word lines WL, at least one dummy word line DWL and a common source line CSL, and may include a plurality of transistor structures TS.

Namely, among the plurality of memory blocks 152, 154 and 156 of the memory device 150, each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one bit line BL, and a plurality of transistors may be realized in one NAND string NS. A string select transistor SST of each NAND string NS may be coupled to a corresponding bit line BL, and a ground select transistor GST of each NAND string NS may be coupled to the common source line CSL. Memory cells MC may be provided between the string select transistor SST and the ground select transistor GST of each NAND string NS. Namely, in the plurality of memory blocks 152, 154 and 156 of the memory device 150, a plurality of memory cells may be realized in each memory block 330.

Figure 5:
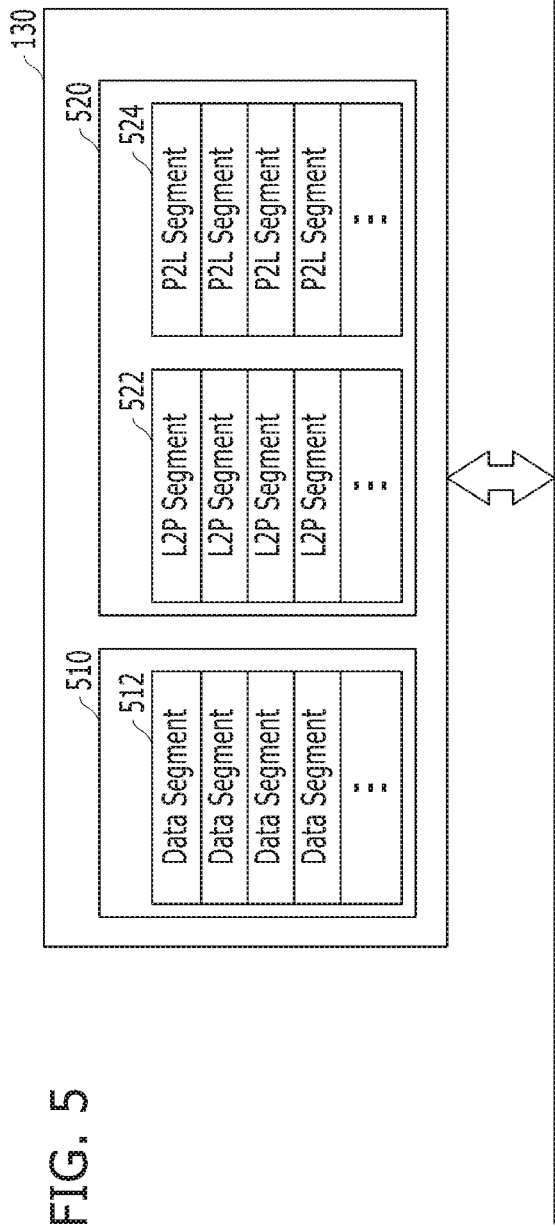
FIG. 5 is a diagram illustrating a data processing operation with respect to a memory device in a memory system in accordance with an embodiment.
Figure 5:
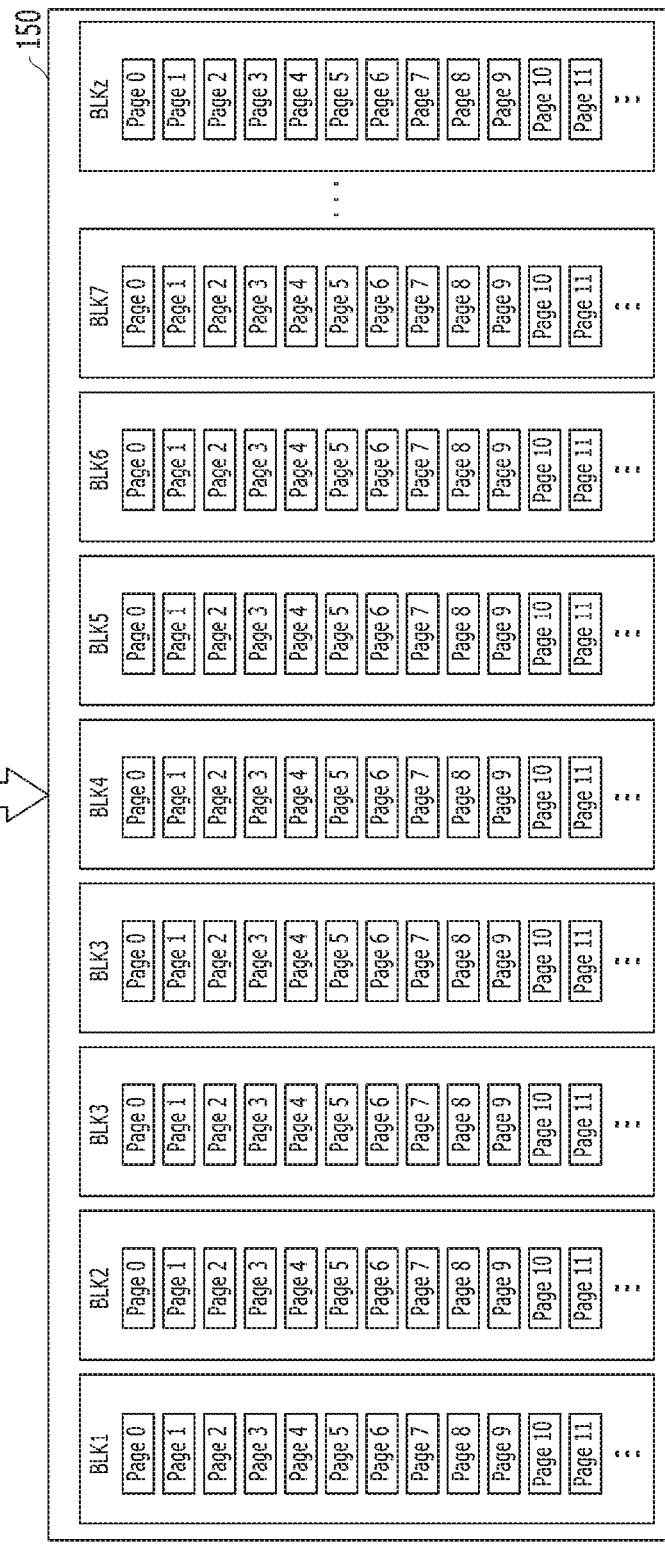

FIG. 5 is a diagram illustrating a data processing operation with respect to a memory device in a memory system in accordance with an embodiment.

Referring to FIG. 5, the controller 130 performs a command operation corresponding to a command received from the host 102, for example, a program operation corresponding to a program command. The controller 130 programs and stores user data corresponding to the program command in the plurality of pages in memory blocks 552, 554, 562, 564, 572, 574, 582 and 584 of the memory device 150.

The controller 130 generates and updates metadata for the user data, and programs and stores the metadata in the memory blocks 552, 554, 562, 564, 572, 574, 582 and 584 of the memory device 150. The metadata include logical to physical (logical/physical or L2P) information and physical to logical (physical/logical or P2L) information for the user data stored in the memory blocks 552, 554, 562, 564, 572, 574, 582 and 584. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all information and data, excluding user data, corresponding to a command received from the host 102.

For example, the controller 130 caches and buffers user data corresponding to a program command received from the host 102, in a first buffer 510 of the controller 130. That is, the controller 130 stores data segments 512 of the user data in the first buffer 510 as a data buffer/cache. The first buffer 510 may be included in the memory 144 of the controller 130. Thereafter, the controller 130 programs and stores the data segments 512 stored in the first buffer 510, in the pages included in the memory blocks 552, 554, 562, 564, 572, 574, 582 and 584 of the memory device 150.

As the data segments 512 of the user data are programmed and stored in the pages in the memory blocks 552, 554, 562, 564, 572, 574, 582 and 584, the controller 130 generates L2P segments 522 and P2L segments 524 as metadata. Then, the controller 130 stores the L2P segments 522 and the P2L segments 524 in a second buffer 520 of the controller 130. The second buffer 520 may be included in the memory 144 of the controller 130. In the second buffer 520, the L2P segments 522 and the P2L segments 524 may be stored in the form of a list. Then, the controller 130 programs and stores the L2P segments 522 and the P2L segments 524 in the pages in the memory blocks 552, 554, 562, 564, 572, 574, 582 and 584 through a map flush operation.

The controller 130 performs a command operation corresponding to a command received from the host 102. For example, the controller 130 performs a read operation corresponding to a read command. The controller 130 checks L2P segments 522 and P2L segments 524 of user data corresponding to the read command by loading them in the second buffer 520. Then, the controller 130 reads data segments 512 of the user data from a storage position known through the checking. That is, the controller 130 reads the data segments 512 from a specific page of a specific memory block among the memory blocks 552, 554, 562, 564, 572, 574, 582 and 584. Then, the controller 130 stores the data segments 512 in the first buffer 510, and provides the data segments 512 to the host 102.

Figure 6:
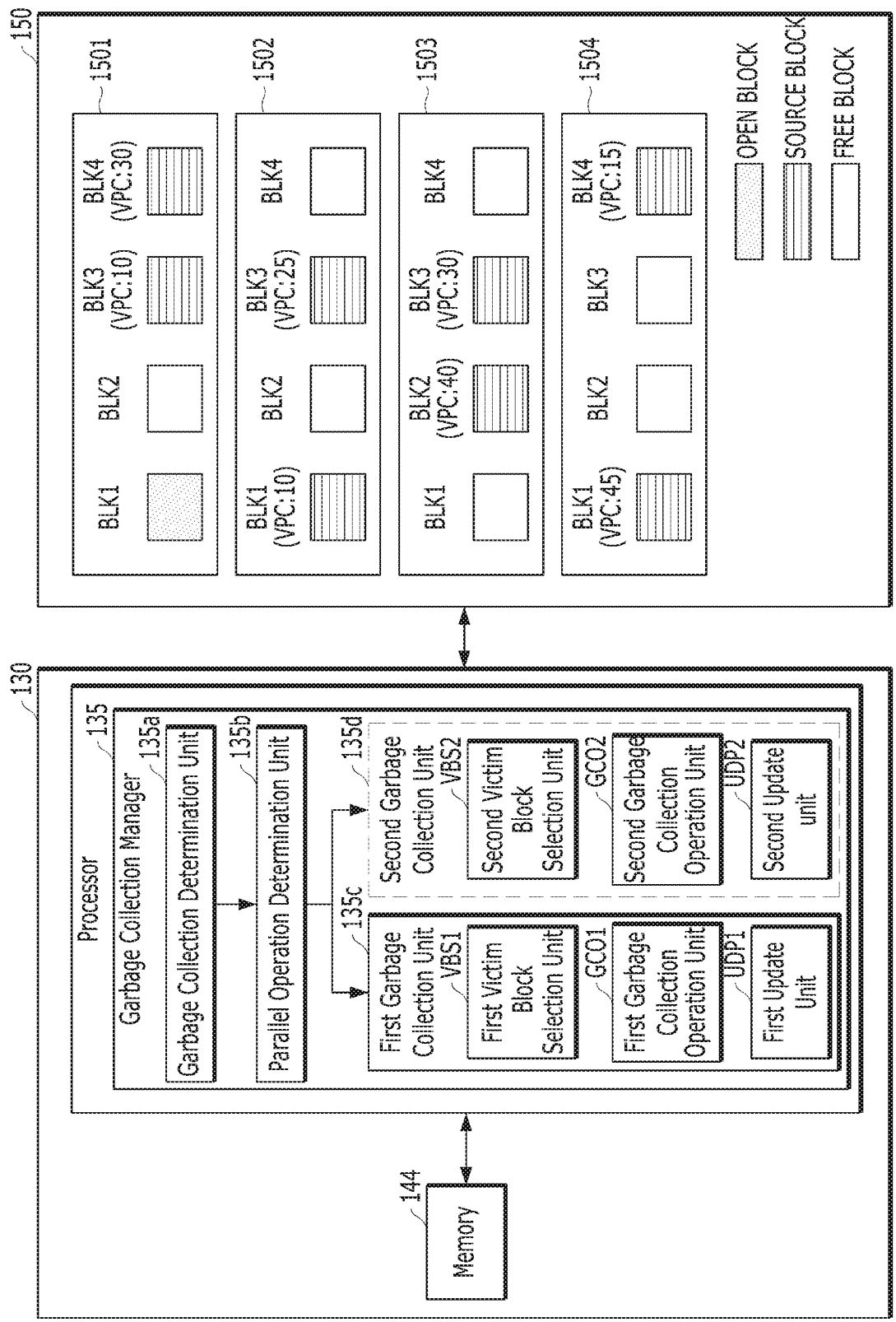
FIGS. 6 and 7 are diagrams for describing a data processing operation of a memory system in accordance with an embodiment.
Figure 7:
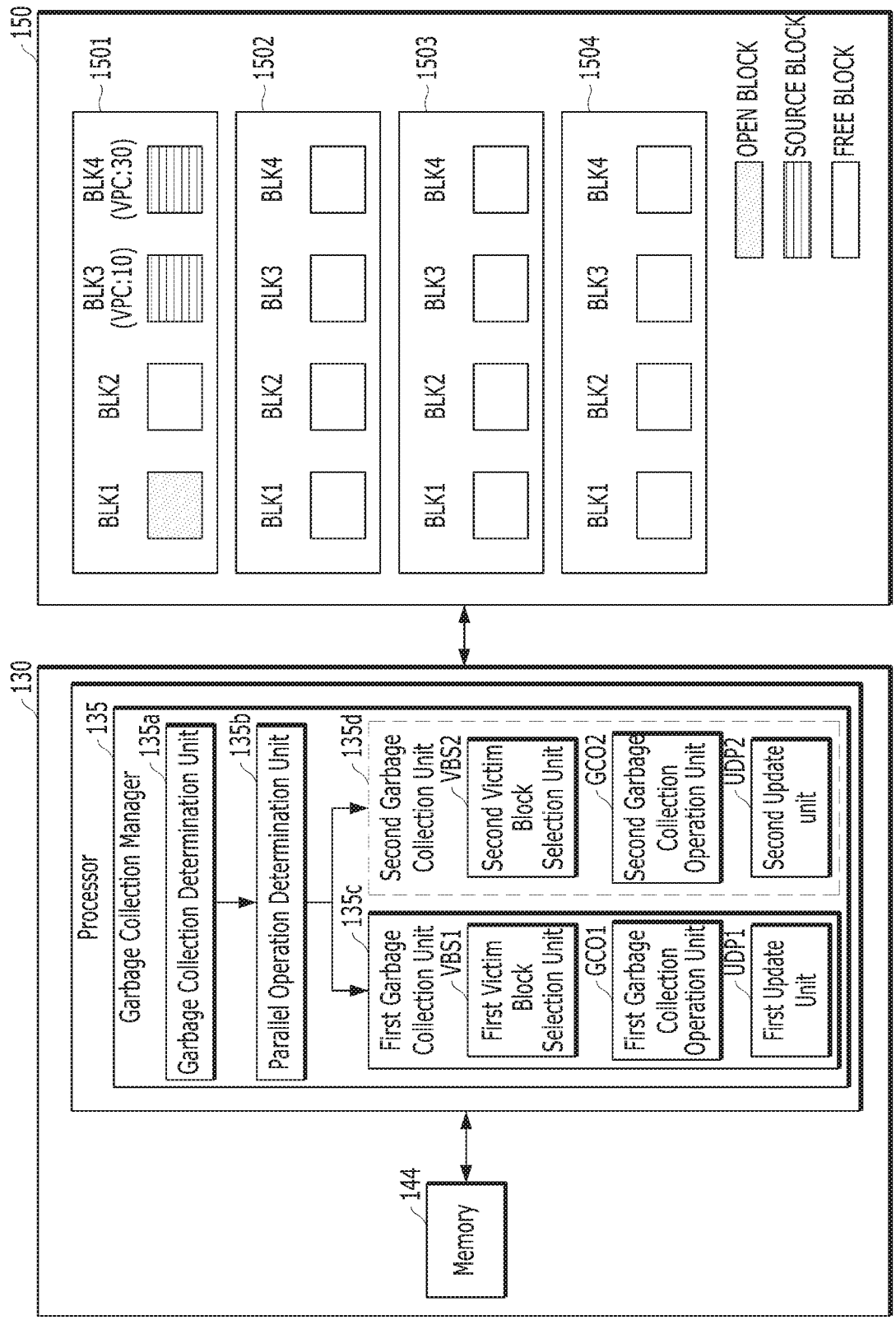

FIGS. 6 and 7 are diagrams for describing a data processing operation of a memory system in accordance with an embodiment. FIG. 6 illustrates the case in which the garbage collection operation and the write operation can be performed in parallel with each other, and FIG. 7 illustrates the case in which the garbage collection operation and the write operation cannot be performed in parallel with each other and thus the garbage collection operation is performed subsequent to the write operation. The present embodiment may be applied to the case in which the memory blocks are not configured as super memory blocks, and the following descriptions will be based on this case.

Referring to FIGS. 6 and 7, the memory device 150 may include a plurality of dies. For example, the plurality of dies 1501 to 1504 may include a first die 1501, a second die 1502, a third die 1503 and a fourth die 1504. Each of the dies 1501 to 1504 may include a plurality of memory blocks. The plurality of memory blocks may include a first memory block BLK1, a second memory block BLK2, a third memory block BLK3 and a fourth memory block BLK4. However, the present embodiment is not limited thereto. The plurality of memory blocks BLK1 to BLK4 may be classified into free blocks, open or active blocks and closed blocks. The free block may indicate a block having no data stored therein, the open block may indicate a block which has data stored therein and includes spare pages to which data can be written, and the closed block may indicate a block which has data stored therein but does not includes spare pages to which data can be written. That is, the closed block does not have any empty page to which data can be written. Based on the above-described definition, the process of the garbage collection manager 135 will be described.

Referring to FIGS. 6 and 7, the garbage collection manager 135 may include a garbage collection determination unit 135a, a parallel operation determination unit 135b, a first garbage collection unit 135c and a second garbage collection unit 135d.

The garbage collection determination unit 135a may determine whether to perform garbage collection based on a free block count (FBC) within the memory device 150 in each predetermined cycle. That is, the garbage collection determination unit 135a may check whether the FBC is less than a first threshold value TH1, in order to determine whether to perform garbage collection. The first threshold value TH1 may correspond to the minimum FBC for determining a point of time that the controller 130 needs to secure one or more free blocks. The first threshold value TH1 may be a predetermined value, and the minimum FBC may be varied depending on an operation condition of the memory system. When the FBC is less than the first threshold value TH1 (FBC<TH1), the garbage collection determination unit 135a may determine that an event for performing a garbage collection operation occurred, and enter a garbage collection mode. On the other hand, when the FBC is equal to or more than the first threshold value TH1 (FBC>=TH1), garbage collection may not be performed, and the garbage collection determination unit 135a may determine whether to perform garbage collection based on the FBC in each predetermined cycle.

When such a garbage collection event occurred, the parallel operation determination unit 135b may check whether the garbage collection operation and a write operation can be performed in parallel with each other. According to the result obtained by checking whether the garbage collection operation and the write operation can be performed in parallel with each other, any one of the first and second garbage collection units 135c and 135d which will be described below may be controlled to perform garbage collection. First, the case in which the garbage collection operation and the write operation can be performed in parallel will be described with reference to FIG. 6.

Referring to FIG. 6, the parallel operation determination unit 135b may check one or more write-target dies each having an open block among the plurality of dies, and then check remaining dies other than the one or more write-target dies among the plurality of dies, in order to determine whether the garbage collection operation and the write operation can be performed in parallel with each other. For example, the check result shows that a die having an open block among the plurality of dies 1501 to 1504 is the first die 1501. Also, the check result exemplifies that a first memory block BLK1 of the plurality of blocks included in the first die 1501 is an open block.

Then, the parallel operation determination unit 135b may check whether closed blocks are present in the other dies, that is, the remaining dies excluding the write-target die having the open block. For example, the parallel operation determination unit 135b may check whether closed blocks are present in the other dies (e.g. the second to fourth dies 1502 to 1504) excluding the first die 1501 having the open block.

When the check result indicates that closed blocks are present in the other dies, the parallel operation determination unit 135b may determine that the garbage collection operation can be performed to one or more garbage-collection-target dies in parallel with the write operation to the write-target die. For example, the second die 1502 may include a first closed block and a third closed block, the third die 1503 may include a second closed block and a third closed block, and the fourth die 1504 may include a first closed block and a fourth closed block. Since the plurality of closed blocks are included in the other dies as described above, the first garbage collection unit 135c may be operated.

The first garbage collection unit 135c may include a first victim block selection unit VBS1, a first garbage collection operation unit GCO1 and a first update unit UD1.

The first victim block selection unit VBS1 may select one or more victim blocks among the plurality of closed blocks included in the other dies, in order to perform garbage collection. The first victim block selection unit VBS1 may select a victim block among the plurality of closed blocks, the victim block including an equal or smaller number of valid pages than a second threshold value TH2. In other words, the first victim block selection unit VBS1 may select one or more victim blocks among the plurality of closed blocks for garbage collection, the one or more victim blocks each including a larger number of valid pages than the second threshold value TH2. The method for selecting the victim block may be divided into two kinds of methods. The first method may correspond to the case in which the second threshold value is set to a valid page ratio, and the second method may correspond to the case in which the second threshold value is set to an average valid page count (VPC).

The first method in which the second threshold value is set to the valid page ratio information will be first described. The first victim block selection unit VBS1 may select a closed block among the plurality of closed blocks included in the other dies as a victim block, the closed block having an equal or smaller number of valid pages than the valid page ratio. For convenience of description, the following descriptions will be based on each memory block including 100 pages. For example, the first victim block selection unit VBS1 may select a closed block among the plurality of closed blocks as a victim block, the closed block having a VPC equal to or less than a valid page ratio of 25%. The valid page ratio may be arbitrarily set. The first closed block included in the second die 1502 has a VPC of 10 and a valid page ratio of 10%, and the third closed block has a VPC of 25 and a valid page ratio of 25%. The second closed block included in the third die 1503 has a VPC of 40 and a valid page ratio of 40%, and the third closed block has a VPC of 30 and a valid page ratio of 30%. The first closed block included in the fourth die 1504 has a VPC of 45 and a valid page ratio of 45%, and the fourth closed block has a VPC of 15 and a valid page ratio of 15%. At this time, since the first and third closed blocks included in the second die 1502 and the fourth closed block included in the fourth die 1504 have a valid page ratio equal to or less than 25%, the closed blocks may be selected as victim blocks.

Hereafter, the second method in which the second threshold value is set to the average VPC will be described. In order to set the second threshold value, the first victim block selection unit VBS1 may calculate the average VPC using the total number of pages included in the plurality of closed blocks included in the other dies. For example, the average VPC may be calculated as 28. The first victim block selection unit VBS1 may select a closed block as a victim block, the closed block having an equal or smaller number of valid pages than 28 which is the average VPC set to the second threshold value. Since the first and third closed blocks included in the second die 1502 and the fourth closed block included in the fourth die 1504 have an equal or smaller number of valid pages than the average VPC of '28', the closed blocks may be selected as victim blocks. The first victim block selection unit VBS1 may select a victim block in the above-described manner.

The first garbage collection operation unit GCO1 may copy the valid pages of the victim block selected by the first victim block selection unit VBS1 into empty pages of a target block. Then, the first garbage collection operation unit GCO1 may erase the victim block to become a free block. For example, the first garbage collection operation unit GCO1 may copy the valid pages of the first and third closed blocks included in the second die 1502 and the fourth closed block included in the fourth die 1504, which are selected as the victim blocks by the first victim block selection unit VBS1 through the first and second methods, into empty pages of the target block. Then, the first garbage collection operation unit GCO1 may erase all of the pages which are included in the first and third closed blocks included in the second die 1502 and the fourth closed block included in the fourth die 1504 to become free blocks.

Since mapping information is changed as valid data of the valid pages included in the victim block are copied into the target block, the first update unit UPD1 may temporarily store the changed mapping information in a second buffer 520 included in the memory 144. Then, the first update unit UPD1 may update a mapping table of the memory device 150 using the mapping information stored in the second buffer 520.

When the garbage collection operation is performed through the above-described method, the garbage collection operation may be performed in parallel with a write operation, and a closed block which could not be selected as a victim block in the conventional memory system may be selected as a victim block, which makes it possible to utilize an over-provisioning space.

FIG. 7 illustrates a configuration related to the case in which the parallel operation determination unit 135*b* checks whether a plurality of closed blocks are present in the other dies, and the check result indicates that a plurality of closed blocks are not present in the other dies.

Referring to FIG. 7, the result obtained by checking whether a plurality of closed blocks are present in the other dies through the parallel operation determination unit 135*b* may indicate that a plurality of closed blocks are not present in the other dies, but included in the first die (i.e., the write-target die) including an open block. That is, since closed blocks which can be selected as victim blocks are not present in the other dies, the parallel operation determination unit 135*b* may determine that the garbage collection operation to the write-target die cannot be performed in parallel with the write operation to the write-target die. Therefore, a second garbage collection operation may be performed through the second garbage collection unit 135*d*.

The second garbage collection unit 135*d* may include a second victim block selection unit VBS2, a second garbage collection operation unit GCO2 and a second update unit UD2.

The second victim block selection unit VBS2 may select one or more victim blocks among the plurality of closed blocks included in the write-target die. At this time, if a write operation is being performed on an open block included in the write-target die, the garbage collection operation may be performed to the write-target die after the write operation is completed to the write-target die. The second victim block selection unit VBS2 may select a victim block among a plurality of closed blocks included in the first die (i.e., the write-target die) including the open block. For example, the second victim block selection unit VBS2 may select a third closed block and a fourth closed block as victim blocks, the victim blocks having an equal or smaller number of valid pages than a third threshold value TH3. That is, the second victim block selection unit VBS2 may select one or more victim blocks among the plurality of closed blocks for garbage collection, the one or more victim blocks having a larger number of invalid pages than the third threshold value TH3. The method for selecting the victim block may be divided into two kinds of methods. The first method may correspond to the case in which the third threshold value is set to a valid page ratio, and the second method may correspond to the case in which the third threshold value is set to an average VPC. Since the first and second methods have been described in detail with reference to FIG. 6, the detailed descriptions thereof will be omitted herein.

According to the first method in which the third threshold value is set to the valid page ratio information, the second victim block selection unit VBS2 may select a closed block among the plurality of closed blocks included in the first die as a victim block, the closed block having an equal or smaller number of valid pages than the valid page ratio. For example, the valid page ratio set to the third threshold value may be set to 25%, for convenience of description. The third closed block included in the first die 1501 has a VPC of 10 and a valid page ratio of 10%, and the fourth closed block has a VPC of 30 and a valid page ratio of 30%. At this time, the third closed block of which the valid page ratio is less than 25% may be selected as a victim block.

The second method in which the third threshold value is set to the average VPC will be described. In order to set the third threshold value, the second victim block selection unit VBS2 may calculate the average VPC using the total number of pages included in the plurality of closed blocks included in the other dies. For example, the average VPC may be calculated as 20. The second victim block selection unit VBS2 may select a closed block of which the VPC is equal to or less than the average VPC set to the third threshold value, as a victim block. At this time, the third closed block of which the VPC is less than the average VPC of '20' may be selected as a victim block. The second victim block selection unit VBS2 may select a victim block in the above-described manner.

The second garbage collection operation unit GCO2 may copy the valid pages of the victim block selected by the second victim block selection unit VBS2 into empty pages of a target block. Then, the second garbage collection operation unit GCO2 may erase the victim block to become a free block. For example, the valid pages of the third closed block selected as the victim block by the second victim block selection unit VBS2 through the first and second methods may be copied into the empty pages of the target block. Then, the second garbage collection operation unit GCO2 may erase all of the pages included in the victim block to become a free block.

Since mapping information is changed as valid data of the valid pages included in the victim block are copied into the free block, the second update unit UPD2 may temporarily store the changed mapping information in the second buffer 520 included in the memory 144. Then, the second update unit UPD2 may update a mapping table of the memory device 150 using the mapping information stored in the second buffer 520.

Figure 8:
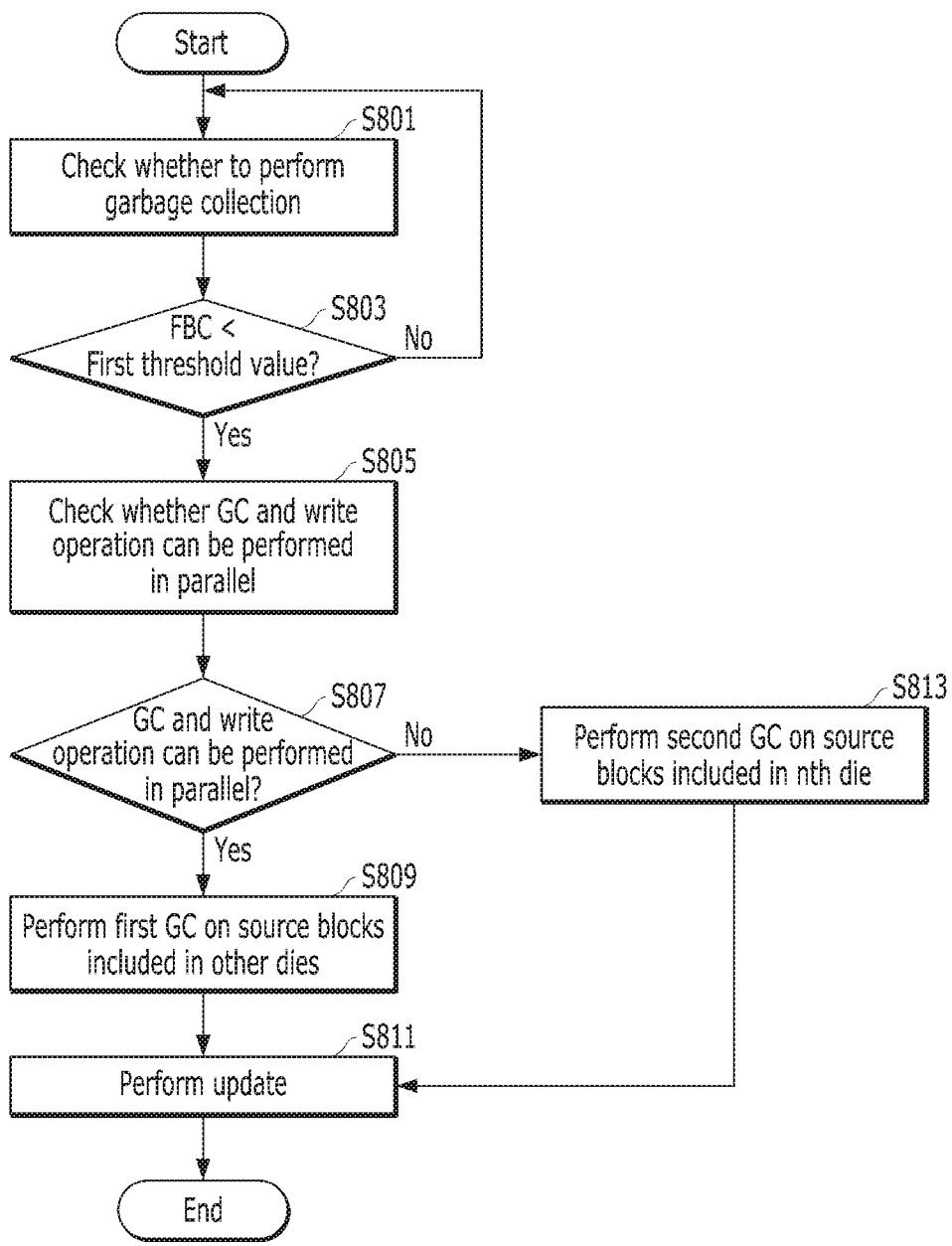
FIGS. 8 to 11 are flowcharts illustrating an operating method of a memory system in accordance with an embodiment.

FIG. 8 is a flowchart illustrating an operating method of a memory system in accordance with an embodiment.

Referring to FIG. 8, the garbage collection manager 135 may determine whether to perform garbage collection, based on an FBC in each predetermined cycle at step S801. That is, the garbage collection manager 135 may check whether the FBC is less than a first threshold value TH1, in order to determine whether to perform garbage collection. The first threshold value TH1 may correspond to the minimum FBC for determining a point of time that the controller 130 needs to secure one or more free blocks. The first threshold value TH1 may be a predetermined value, and the minimum FBC may be varied depending on an operation condition of the memory system.

At step S803, the garbage collection manager 135 may check whether the FBC is less than the first threshold value TH1. When the check result of step S803 indicates that the FBC is less than the first threshold value TH1 (FBC<TH1), the garbage collection manager 135 may determine that an event for performing a garbage collection operation occurred, and perform step S805 to perform garbage collection.

On the other hand, when the check result of step S803 indicates that the FBC is equal to or more than the first threshold value TH1 (FBC>=TH1), the garbage collection manager 135 may not perform garbage collection, and return to step S801.

When the garbage collection event occurs, the garbage collection manager 135 may check whether the garbage collection operation can be performed to the garbage-collection-target dies in parallel with a write operation to the write-target die, at steps S805 and S807. According to the result obtained by checking whether the garbage collection operation can be performed to the garbage-collection-target dies in parallel with a write operation to the write-target die, any one of first and second garbage collection operations which will be described below may be determined to perform garbage collection.

Figure 9:
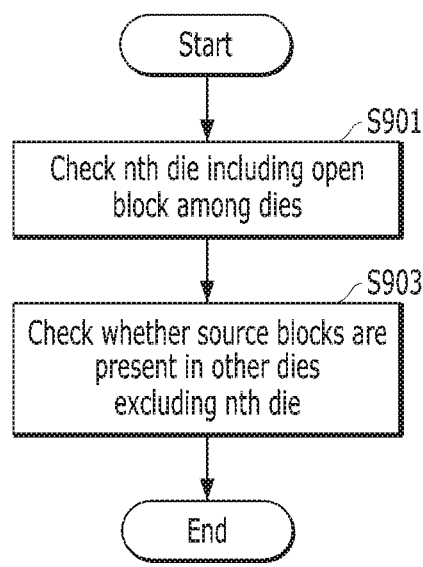

The method for checking whether the garbage collection operation can be performed in parallel with a write operation will be described with reference to FIG. 9.

At step S901, the garbage collection manager 135 may check one or more write-target dies each including an open block among the plurality of dies, and then check the other dies excluding the one or more write-target dies among the plurality of dies.

At step S903, the garbage collection manager 135 may check whether closed blocks are present in the other dies excluding the one or more write-target dies including the open block. When the check result indicates that closed blocks are present in the other dies, the garbage collection manager 135 may determine that the garbage collection operation can be performed to the garbage-collection-target dies in parallel with a write operation to the write-target die.

On the other hand, when a plurality of closed blocks are not present in the other dies, but present in the one or more write-target dies including the open block, it may indicate that any garbage-collection-target die cannot be selected among the other dies. Thus, the garbage collection manager 135 may determine that the garbage collection operation cannot be performed to any garbage-collection-target die and thus the garbage collection operation cannot be performed to the write-target die in parallel with a write operation to the write-target die.

Referring back to FIG. 8, when the check result of step S807 indicates that the garbage collection operation can be performed to the garbage-collection-target dies in parallel with a write operation to the write-target die according to the determination result of step S903, the garbage collection manager 135 may perform the first garbage collection operation on the plurality of closed blocks included in the other dies at step S809. The first garbage collection operation method will be described with reference to FIG. 10.

Figure 10:
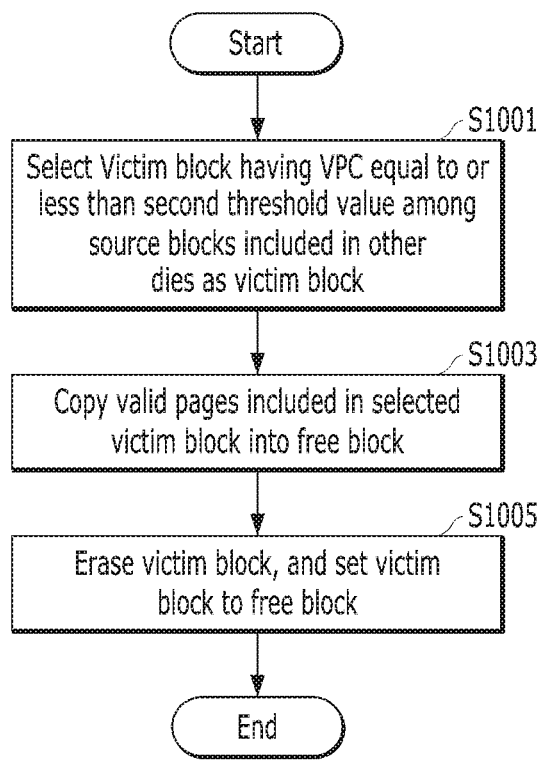

Referring to FIG. 10, the garbage collection manager 135 may select one or more victim blocks among the plurality of closed blocks included in the other dies, in order to perform the first garbage collection operation, at step S1001. The garbage collection manager 135 may select a victim block among the plurality of closed blocks, the victim block having an equal or smaller number of valid pages than a second threshold value TH2. The method for selecting the victim block may be divided into two kinds of methods. The first method may correspond to the case in which the second threshold value is set to a valid page ratio, and the second method may correspond to the case in which the second threshold value is set to an average VPC.

The first method in which the second threshold value is set to the valid page ratio information will be first described. The garbage collection manager 135 may select a closed block among the plurality of closed blocks included in the other dies as a victim block, the closed block having an equal or smaller number of valid pages than the valid page ratio. The second method may correspond to the case in which the second threshold value is set to the average VPC. In order to set the second threshold value, the garbage collection manager 135 may calculate the average VPC using the total number of pages included in the plurality of closed blocks included in the other dies. The garbage collection manager 135 may set the calculated average VPC to the second threshold value, and select a closed block of which the VPC is equal to or less than the average VPC, as a victim block.

At step S1003, the garbage collection manager 135 may copy the valid pages of the selected victim block into empty pages of a target block.

At step S1005, the garbage collection manager 135 may erase the victim block to become a free block. When the garbage collection operation is performed through the above-described method, the garbage collection operation can be performed to the garbage-collection-target dies in parallel with a write operation to the write-target die, and a closed block which could not be selected as a victim block in the conventional memory system may also be selected as a victim block, which makes it possible to utilize an over-provisioning space.

Referring back to FIG. 8, when the check result of step S807 indicates that the garbage collection operation cannot be performed in parallel with a write operation (No), the garbage collection manager 135 may perform the second garbage collection on the closed block included in the write-target die at step S813. The second garbage collection method will be described with reference to FIG. 11.

Figure 11:
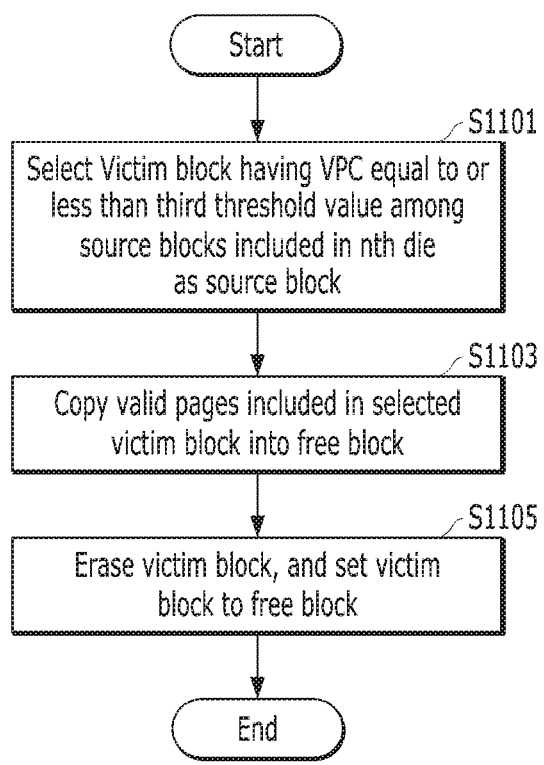

Referring to FIG. 11, the garbage collection manager 135 may select one or more victim blocks among the plurality of closed blocks included in the write-target die including the open block at step S1101. At this time, if a write operation is being performed on an open block included in the write-target die, the garbage collection operation to the write-target die may be performed after the write operation is completed to the write-target die. The garbage collection manager 135 may select a victim block among the plurality of closed blocks, the victim block having an equal or smaller number of valid pages than a third threshold value TH3. The method for selecting the victim block may be divided into two kinds of methods. The first method may correspond to the case in which the third threshold value is set based on a valid page ratio, and the second method may correspond to the case in which the third threshold value is set based on an average VPC.

The first method in which the third threshold value is set to the valid page ratio information will be first described. The garbage collection manager 135 may select a closed block among the plurality of closed blocks included in the write-target die as a victim block, the closed block having an equal or smaller number of valid pages than the valid page ratio. The second method may correspond to the case in which the third threshold value is set to the average VPC. In order to set the third threshold value, the garbage collection manager 135 may calculate the average VPC using the total number of pages included in the plurality of closed blocks included in the write-target die. The garbage collection manager 135 may set the calculated average VPC to the third threshold value, and select a closed block of which the VPC is equal to or less than the average VPC, as a victim block.

At step S1103, the garbage collection manager 135 may copy the valid pages of the selected victim block into empty pages of a free block.

At step S1105, the garbage collection manager 135 may erase the victim block to become a free block.

Referring back to FIG. 8, when the first or second garbage collection operation is performed through step S809 or S813, mapping information may be changed as valid data of the valid pages included in the victim block are copied into the target block. Thus, at step S811, the garbage collection manager 135 may temporarily store the changed mapping information in the second buffer 520 included in the memory 144, and update the mapping table of the memory device 150 using the mapping information stored in the second buffer 520.

Figure 12:
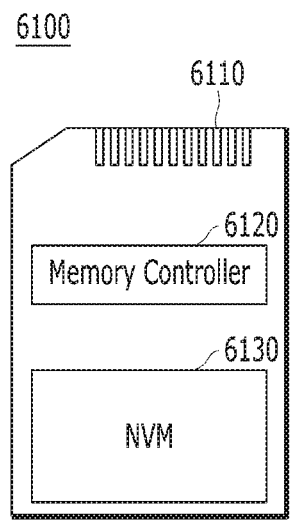
FIGS. 12 to 20 are diagrams illustrating examples of memory systems in accordance with embodiments.

FIG. 12 is a diagram illustrating a data processing system including a memory system in accordance with an embodiment. FIG. 12 illustrates a memory card system 6100 to which the memory system is applied.

Referring to FIG. 12, the memory card system 6100 includes a connector 6110, a memory controller 6120 and a memory device 6130.

The memory controller 6120 is connected with, for access to, the memory device 6130, which is implemented as a nonvolatile memory (NVM). For example, the memory controller 6120 controls the read, write, erase and background operations of the memory device 6130. The memory controller 6120 provides an interface between the memory device 6130 and a host (not shown), and drives firmware for controlling the memory device 6130. That is, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processor, a host interface, a memory interface and an error correction component.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 13:
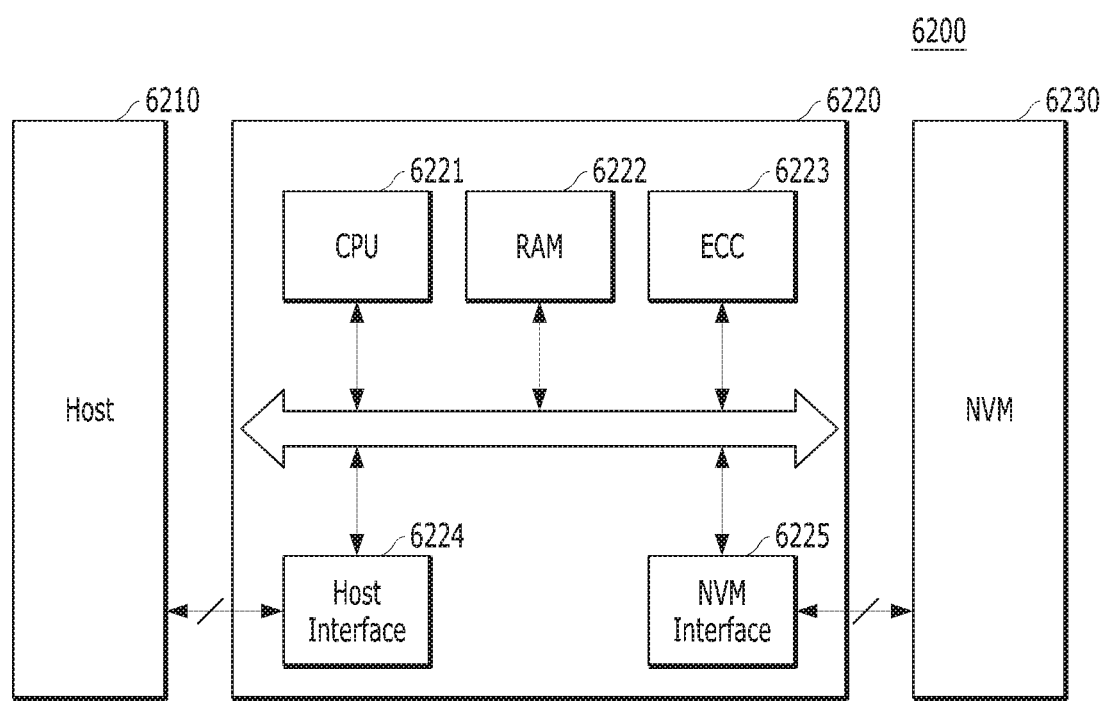

FIG. 13 is a diagram illustrating a data processing system 6200 including a memory system in accordance with an embodiment.

Referring to FIG. 13, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD). The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 controls read, write and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 to operate at a high speed.

The ECC circuit 6223 corresponds to the ECC component 138 of the controller 130. The ECC circuit 6223 generates an error correction code (ECC) for correcting a failed bit or an error bit in the data received from the memory device 6230.

Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using any of various coded modulations such as an LDPC code, a BCH code, a turbo code, a Reed-Solomon code, a convolution code, an RSC, a TCM and a BCM.

The memory controller 6220 exchanges data with the host 6210 through the host interface 6224, and exchanges data with the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long term evolution (LTE) is implemented, the memory controller 6220 may transmit and receive data by being connected with an external device, for example, the host 6210 or another external device. Specifically, as the memory controller 6220 is configured to communicate with an external device through at least one among various communication protocols, the memory system and the data processing system may be applied to wired and/or wireless electronic appliances, particularly a mobile electronic appliance.

Figure 14:
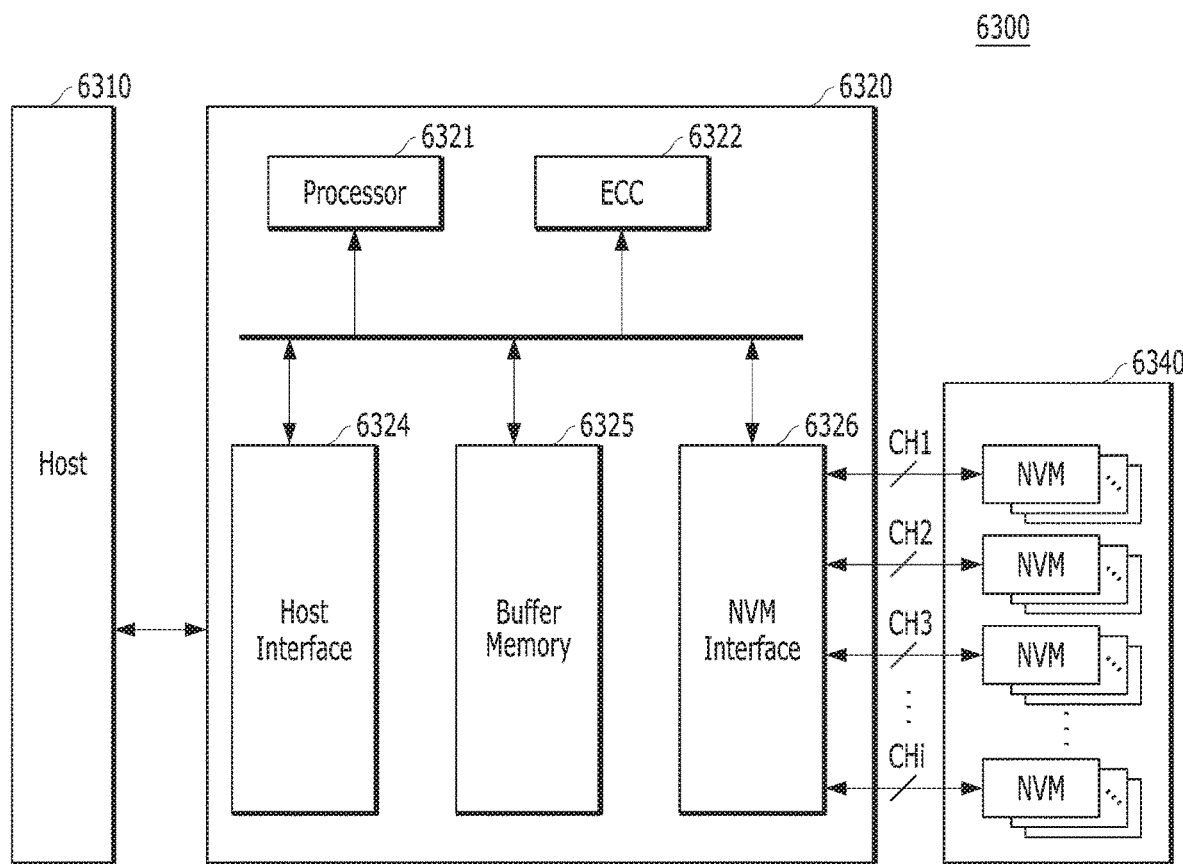

FIG. 14 is a diagram illustrating a data processing system including a memory system in accordance with an embodiment. FIG. 14 illustrates a solid state drive (SSD) 6300 to which the memory system is applied.

Referring to FIG. 14, the SSD 6300 includes a controller 6320 and a memory device 6340 which includes a plurality of nonvolatile memories (NVM). The controller 6320 may correspond to the controller 130 in the memory system 110 described above with reference to FIG. 1, and the memory device 6340 may correspond to the memory device 150 in the memory system 110 described above with reference to FIG. 1.

The controller 6320 is connected with the memory device 6340 through a plurality of channels CH1, CH2, CH3, . . . and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory such as, but not limited to, a DRAM, an SDRAM, a DDR SDRAM, an LPDDR SDRAM and a GRAM or a nonvolatile memory such as, but not limited to, an FRAM, an ReRAM, an STT-MRAM and a PRAM. While it is illustrated in FIG. 13 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, . . . and CHi.

As a plurality of SSDs 6300 each of which the memory system 110 described above with reference to FIG. 1 is applied to are used, a data processing system, for example, a redundant array of independent disks (RAID) system may be implemented. In the RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, corresponding to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system, that is, at least one SSD 6300, corresponding to the RAID level information of the received read command, among the plurality of RAID levels, that is, the plurality of SSDs 6300, and may provide data outputted from the selected SSD 6300 to the host 6310.

Figure 15:
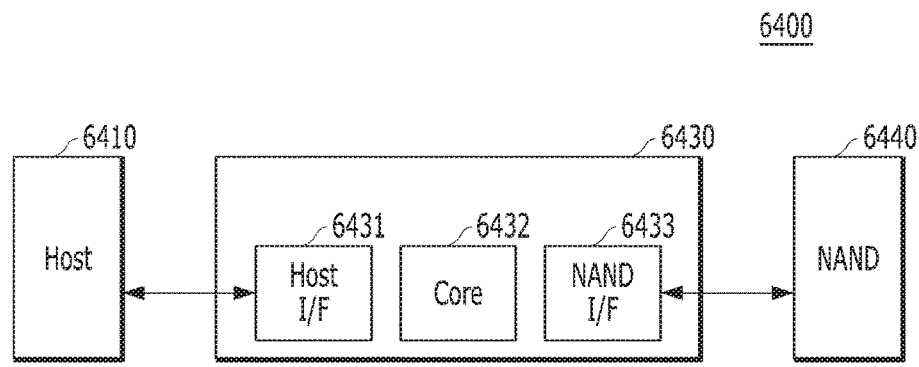

FIG. 15 is a diagram illustrating a data processing system including a memory system in accordance with an embodiment. FIG. 15 illustrates an embedded multimedia card (eMMC) 6400 to which the memory system is applied.

Referring to FIG. 15, the eMMC 6400 includes a controller 6430 and a memory device 6440 which is implemented by at least one NAND flash memory. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, or may be a serial interface, for example, an ultra high speed (UHS)-I/UHS-II and a UFS interface.

FIGS. 16 to 19 are diagrams illustrating examples of data processing systems including a memory system in accordance with embodiments. Each of FIGS. 16 to 19 illustrates a universal flash storage (UFS) to which the memory system is applied.

Referring to FIGS. 16 to 19, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the like. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the likes, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 16 to 19, and the UFS cards 6530, 6630, 6730 and 6830 may be implemented in the form of the memory card system 6100 described above with reference to FIG. 15.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, various card protocols such as universal storage bus (USB) Flash Drives (UFDs), multi-media card (MMC), secure digital (SD), mini SD and Micro SD.

Figure 16:
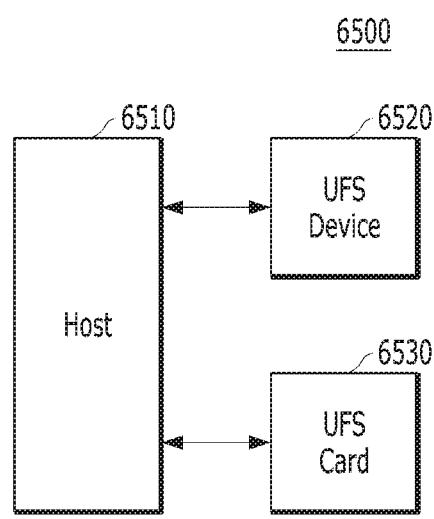

In the UFS system 6500 shown in FIG. 16, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

Figure 17:
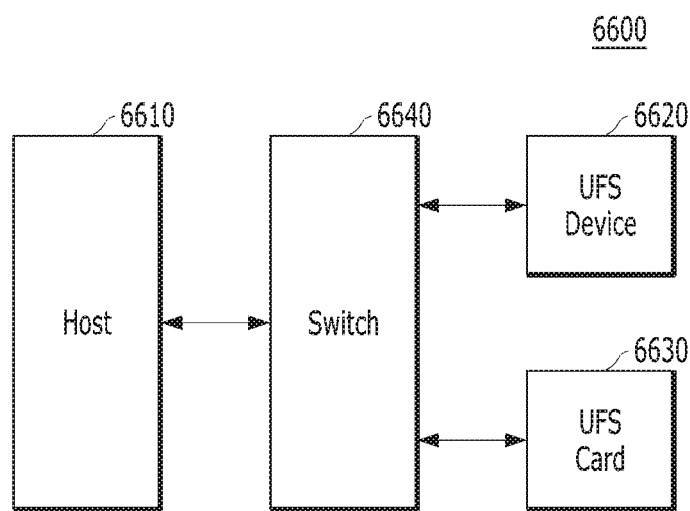

In the UFS system 6600 shown in FIG. 17, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

Figure 18:
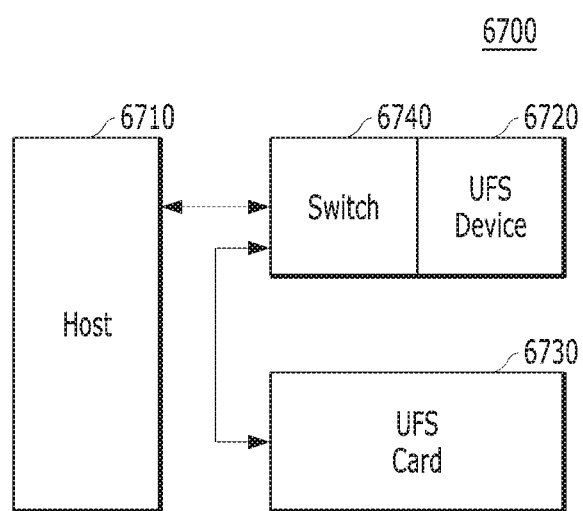

In the UFS system 6700 shown in FIG. 18, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 19:
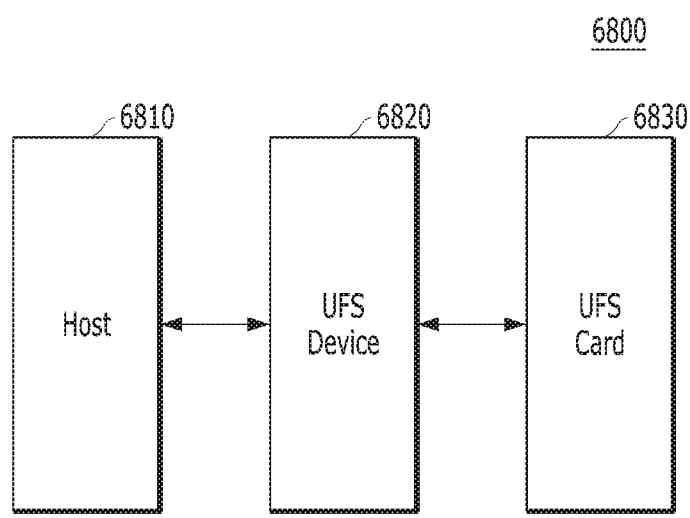

In the UFS system 6800 shown in FIG. 19, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 20:
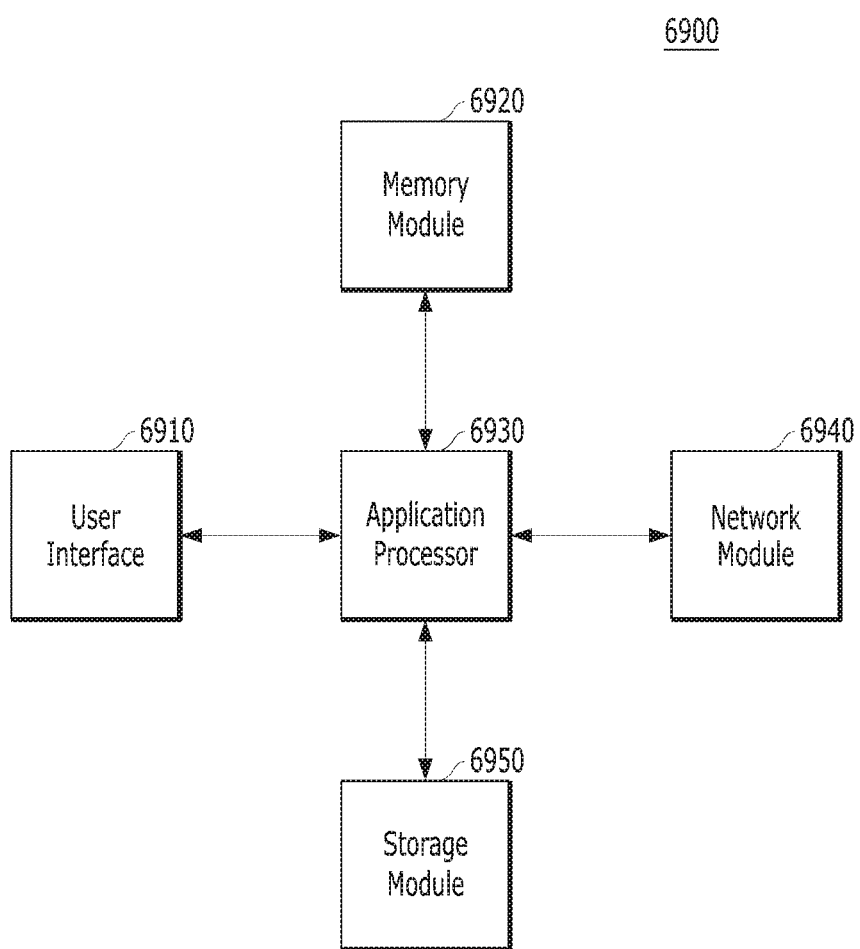

FIG. 20 is a diagram illustrating a data processing system including a memory system in accordance with an embodiment. FIG. 20 illustrates a user system 6900 to which the memory system is applied.

Referring to FIG. 20, the user system 6900 includes a user interface 6910, a memory module 6920, an application processor 6930, a network module 6940, and a storage module 6950.

The application processor 6930 drives components included in the user system 6900 and an operating system (OS). For example, the application processor 6930 may include controllers for controlling the components included in the user system 6900, interfaces, graphics engines, and so on. The application processor 6930 may be provided by a system-on-chip (SoC).

The memory module 6920 may operate as a main memory, a working memory, a buffer memory or a cache memory of the user system 6900. The memory module 6920 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, an ReRAM, an MRAM and an FRAM. For example, the application processor 6930 and the memory module 6920 may be mounted by being packaged on the basis of a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. Thus, the memory system and the data processing system may be applied to wired and/or wireless electronic appliances. The network module 6940 may be included in the application processor 6930.

The storage module 6950 may store data, for example, data received from the application processor 6930, and transmit data stored therein, to the application processor 6930. The storage module 6950 may be implemented by a nonvolatile memory such as a phase-change RAM (PRAM), a magnetic RAM (MRAM), a resistive RAM (ReRAM), a NAND flash memory, a NOR flash memory and a 3-dimensional NAND flash memory. Also, the storage module 6900 may be provided as a removable storage medium such as a memory card of the user system 6900 and an external drive. That is, the storage module 6950 may correspond to the memory system 110 described above with reference to FIG. 1, and may be implemented as the SSD, eMMC and UFS described above with reference to FIGS. 16 to 19.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

In accordance with the present embodiments, the memory system and the operating method thereof can determine whether a garbage collection operation can be performed in parallel to a write operation. When the garbage collection operation can be performed in parallel to the write operation, the memory system and the operating method thereof can select a victim block based on the determination result, and perform the garbage operation, thereby reducing the time required for performing the garbage collection operation.

What is claimed is:

1. A memory system comprising:
    a memory device including a plurality of dies each having a plurality of memory blocks; and
    a controller including a processor and a memory,
    wherein the processor comprises a garbage collection manager suitable for:
    checking whether a plurality of closed blocks is present in other dies other than a write-target die including an open block among the plurality of dies,
    determining whether to perform a garbage collection operation to the other dies in parallel with a write operation to the write-target die based on a result of the checking of whether the plurality of closed blocks is present in the other dies,
    selecting one or more garbage-collection-target dies among the other dies and a victim block among the closed blocks within the garbage-collection-target dies when the plurality of closed blocks is present in the other dies, and
    performing the garbage collection operation to the garbage-collection-target dies in parallel with the write operation to the write-target die according to a result of the determining.

2. The memory system of claim 1, wherein the garbage collection manager may further select victim block among the closed blocks within the write-target die and perform the garbage collection operation to the write-target die subsequent to the write operation, when the plurality of closed blocks are not present in the other dies.

3. The memory system of claim 2, wherein the garbage collection manager comprises:
    a garbage collection determination unit suitable for determining whether to perform the garbage collection operation by comparing a free block count (FBC) within the memory device with a first threshold value;
    a parallel operation determination unit suitable for checking the other dies when the FBC is equal to or less than the first threshold value, checking whether the closed blocks are present in the other dies and determining whether to perform the garbage collection operation in parallel with the write operation based on a result of the checking of whether the plurality of closed blocks are present in the other dies;
    a first garbage collection unit suitable for performing the garbage collection operation to the garbage-collection-target dies in parallel with the write operation when the plurality of closed blocks are present in the other dies; and
    a second garbage collection unit suitable for performing the garbage collection operation to the garbage-collection-target dies subsequent to the write operation when a closed block is present in the write-target die.

4. The memory system of claim 3, wherein the first garbage collection unit comprises:
    a first victim block selection unit suitable for selecting a victim block having a valid page count (VPC) equal to or less than a second threshold value among the plurality of closed blocks within the garbage-collection-target dies;
    a first garbage collection operation unit suitable for moving valid data stored in the victim block into a target block within the garbage-collection-target dies, and erasing the victim block; and
    a first update unit suitable for updating a mapping table of the memory device according to the move of the valid data.

5. The memory system of claim 4, wherein the second threshold value represents a valid page ratio within a memory block.

6. The memory system of claim 4, wherein the second threshold value represents an average VPC within a memory block.

7. The memory system of claim 3, wherein the second garbage collection unit comprises:
 a second victim block selection unit suitable for selecting a victim block having a VPC equal to or less than a third threshold value among the plurality of closed blocks included in the write-target die, wherein the third threshold value indicates a valid page ratio or average VPC;
 a second garbage collection operation unit suitable for moving valid data stored in the victim block into a target block within the write-target die, and erasing the victim block; and
 a second update unit suitable for updating a mapping table of the memory device according to the move of the valid data.

8. The memory system of claim 7, wherein the third threshold value represents a valid page ratio within a memory block.

9. The memory system of claim 7, wherein the third threshold value represents an average VPC within a memory block.

10. An operating method of a memory system which includes: a memory device including a plurality of dies each having a plurality of memory blocks; and a controller including a processor and a memory, the operating method comprising:
 checking whether a plurality of closed blocks is present in other dies other than a write-target die including an open block among the plurality of dies;
 determining whether to perform a garbage collection operation to the other dies in parallel with a write operation to the write-target die based on a result of the checking;
 selecting one or more garbage-collection-target dies among the other dies and a victim block among the closed blocks within the garbage-collection-target dies, when the plurality of closed blocks is present in the other dies; and
 performing the garbage collection operation to the garbage-collection-target dies in parallel with the write operation according to a result of the determining.

11. The operating method of claim 10, further comprising:
 selecting victim block among the closed blocks within the write-target die and perform the garbage collection operation to the write-target die subsequent to the write operation, when the plurality of closed blocks is not present in the other dies.

12. The operating method of claim 10, wherein whether to perform the garbage collection operation is determined by comparing a free block count (FBC) within the memory device to a first threshold value.

13. The operating method of claim 10, wherein the determining of whether to perform the garbage collection operation includes:
 determining the garbage collection operation to be performed in parallel with the write operation when the plurality of closed blocks are present in the other dies; and
 determining the garbage collection operation to be performed in subsequent to the write operation when the plurality of closed blocks are not present in the other dies and a closed block is present in the write-target die.

14. The operating method of claim 13, wherein the performing of the garbage collection operation in parallel with the write operation includes:
 selecting a victim block having a valid page count (VPC) equal to or less than a second threshold value among the plurality of closed blocks within the garbage-collection-target dies;
 moving valid data stored in the victim block into a target block within the garbage-collection-target dies; and
 erasing the victim block.

15. The operating method of claim 14, wherein the second threshold value represents one of a valid page ratio and an average VPC within a memory block.

16. The operating method of claim 13, wherein the performing of the garbage collection operation subsequent to the write operation includes:
 selecting a victim block having a VPC equal to or less than a third threshold value among the plurality of closed blocks included in the write-target die;
 moving valid data stored in the victim block into a target block within the write-target die; and
 erasing the victim block.

17. The operating method of claim 16, wherein the second threshold value represents one of a valid page ratio and an average VPC within a memory block.

18. The operating method of claim 10, further comprising updating a mapping table of the memory device according to a result of the garbage collection operation.

19. A memory system comprising:
 a memory device including plural memory dies each having plural memory blocks; and
 a controller configured to control the memory device to independently perform an operation to each of the memory dies,
 wherein the controller controls the memory device to perform a write operation to a first one among the memory dies while performing a garbage collection operation to a second one among the memory dies,
 wherein the controller comprises a garbage collection manager suitable for:
 checking whether a plurality of source blocks are present in second memory dies other than a first memory die including an open block among the memory dies;
 determining whether the garbage collection operation is able to be performed in parallel to the write operation;
 selecting a victim block according to the determination result; and
 performing a first or second garbage collection operation when a garbage collection event occurs.

20. The memory system of claim 19,
 wherein the first memory die includes the open block as a subject for the write operation, and
 wherein each of the second memory dies includes a closed block and a free block as subjects for the garbage collection operation.

21. The memory system of claim 19,
 wherein the garbage collection manager comprises:
 a garbage collection determination unit suitable for determining whether to perform the garbage collection operation by comparing a free block count (FBC) within the memory device with a first threshold value;
 a parallel operation determination unit suitable for checking the second memory dies when the FBC is equal to or less than the first threshold value, checking whether a plurality of closed blocks are present in the second memory dies and determining whether to perform the garbage collection operation in parallel with the write operation based on a result of the checking of whether the plurality of closed blocks are present in the second memory dies;

a first garbage collection unit suitable for performing the garbage collection operation to garbage-collection-target dies among the second memory dies in parallel with the write operation when the plurality of closed blocks are present in the second memory dies; and a second garbage collection unit suitable for performing the garbage collection operation to the garbage-collection-target dies subsequent to the write operation when a closed block is present in the first memory die.

* * * * *